(12) United States Patent
Hepburn (10) Patent No.: US 6,896,278 B1
(45) Date of Patent: May 24, 2005

(54) MOTOR CYCLE ACCESSORIES (76) Inventor: Grant Hepburn, 150 Ciagiraba Road, Clagiraba, Queensland 4211 (AU)

( * ) Notice: Subject to any disclaimer, the term of this patent is extended or adjusted under 35 U.S.C. 154(b) by 0 days.

(21) Appl. No.: 09/697,647

(22) Filed: Oct. 27, 2000

(51) Int. Cl.⁷ .................................. B62J 35/00
(52) U.S. Cl. .................. 280/304.3; 280/770; 280/848
(58) Field of Search .................. 280/304.3, 281.1, 280/288.4, 290, 770, 848, 833; 180/219, 229, 225; 219/203

(56) References Cited

U.S. PATENT DOCUMENTS

| | | | | |
|---|---|---|---|---|
| 3,088,539 A | * | 5/1963 | Mathues et al. ......... | 280/304.3 |
| 4,010,812 A | * | 3/1977 | Bothwell ................. | 280/281 |
| 4,068,895 A | | 1/1978 | Reese et al. | |
| D264,704 S | * | 6/1982 | Rehberg ................. | 280/288.4 |
| 4,411,333 A | * | 10/1983 | Bothwell ................. | 280/281 |
| 4,469,256 A | * | 9/1984 | McEwen ................. | 280/288.4 |
| D300,418 S | | 3/1989 | Yamada et al. | |
| 4,828,303 A | * | 5/1989 | Soria ..................... | 280/770 |
| 4,936,599 A | * | 6/1990 | McNamee ............... | 280/770 |
| 4,969,674 A | * | 11/1990 | Wagner .................. | 280/770 |
| 5,160,827 A | * | 11/1992 | Parker .................... | 219/203 |
| 5,330,029 A | * | 7/1994 | Yoshimura et al. ....... | 180/219 |
| 5,452,935 A | * | 9/1995 | Mascia ................... | 280/770 |
| 5,849,390 A | * | 12/1998 | Dillon .................... | 280/770 |
| 5,884,380 A | * | 3/1999 | Thurm ................... | 180/219 |
| 6,062,601 A | * | 5/2000 | Willie et al. ............. | 280/770 |
| 6,105,701 A | * | 8/2000 | Buell ...................... | 180/229 |
| 6,213,514 B1 | * | 4/2001 | Natsume et al. ......... | 280/833 |
| 6,290,017 B1 | * | 9/2001 | Ito ......................... | 180/219 |
| 6,341,792 B1 | * | 1/2002 | Okuma .................. | 280/770 |

FOREIGN PATENT DOCUMENTS

| | | | | |
|---|---|---|---|---|
| JP | 1204876 | * | 8/1989 | ......... 280/304.3 |
| WO | 96/00677 | | 1/1996 | |
| WO | 98/41440 | | 9/1998 | |

* cited by examiner

Primary Examiner—Hau Phan
(74) Attorney, Agent, or Firm—Shoemaker and Mattare (57) ABSTRACT

A protector device for a motorcycle includes at least one impact resistant cover member which is configured to cover a part of a motorcycle that is prone to damage by flying debris. The, or each, cover member is removably attachable to said part of the motorcycle.

6 Claims, 6 Drawing Sheets

MOTOR CYCLE ACCESSORIES

FIELD OF THE INVENTION

This invention relates to motorcycle accessories. More particularly, this invention relates to a protective device for a motorcycle.

BACKGROUND OF THE INVENTION

Late model motorcycles as well as restored or customised motorcycles usually have what is generally recognised as an expensive paint finish. Applicant submits that the reason for this is that motorcycles are often marketed on the basis of their appearance.

It follows that it is desirable to protect the paint finish on such motorcycles. This has been attempted by placing protective covers on, for example, the fuel tank. These protective covers are generally regarded as unattractive and cumbersome.

Another attempt to protect parts of the motorcycle has been through the use of fairings. Fairings are popular with certain makes of motorcycles. However, fairings are often undesirable from an aesthetic point of view, or simply inconvenient and impractical. Fairings are often particularly undesirable for certain types of motorcycles such as those manufactured by the Harley Davidson (Trade Mark) Company.

It follows that the Applicant has identified a need for a protective device for a motorcycle that does not detract from the aesthetic appeal of the motorcycle.

SUMMARY OF THE INVENTION

According to the invention, there is provided a protective device for a motorcycle, the protective device including at least one impact resistant cover member which is configured to cover a part of a motorcycle that is prone to damage by flying debris, the, or each, cover member being removably attachable to said part of the motorcycle.

The, or each, cover member may be of a transparent material so that said part of the motorcycle is visible beneath the protective device.

The, or each, cover member may be of a flexible material. Further, the, or each, cover member may be of a plastics material.

The, or each, cover member may be of a resilient material.

The attachment means may be in the form of at least one suction connector that is mounted on the, or each, cover member, to extend from an operatively inner side of the cover member. The protective device may include a number of suction connectors mounted on the, or each, cover member.

Each suction connector may include a suction cup that is connected to the cover member to extend from the inner side of the cover member. Each suction connector may include an attachment formation that extends from the suction cup. The, or each, cover member may have a number of complementary attachment formations, each attachment formation being releasably engageable with a respective complementary attachment formation.

Each complementary attachment formation may be in the form of an opening defined in the cover member. Each complementary attachment formation may be received in each respective opening to engage the cover member.

Each suction connector may be configured so that, when the, or each, cover member is attached to said part of the motorcycle, the, or each cover member is spaced from said part of the motorcycle.

Each cover member may be of a material which has inherent clinging characteristics so that the, or each, cover member effectively clings to said part of the motorcycle, in use.

The, or each, cover member may be in the form of a removable film which is shaped to correspond to said part of the motorcycle.

The, or each, cover member may be of a material selected from polyolefins and polyamides.

Instead, an adhesive may be arranged on an operatively inner surface of the, or each, cover member.

Where the, or each, cover member is configured to attach directly to said part of the motorcycle, the, or each, cover member may be of a suitable thickness to provide the necessary shielding effect.

The protective device may include a pair of cover members. Each cover member may be locatable over a respective frontal side region of a fuel tank of the motorcycle.

Instead of being transparent, the, or each, cover member may be of a translucent material.

A protective device, in accordance with this invention, for a motorcycle, may manifest itself in a variety of forms. Preferred embodiments of the invention are described below with reference to the accompanying drawings. It is to be clearly understood however that the specific nature of this description does not supersede the generality of the preceding broad description.

DETAILED DESCRIPTION OF THE DRAWINGS

Figure 1:
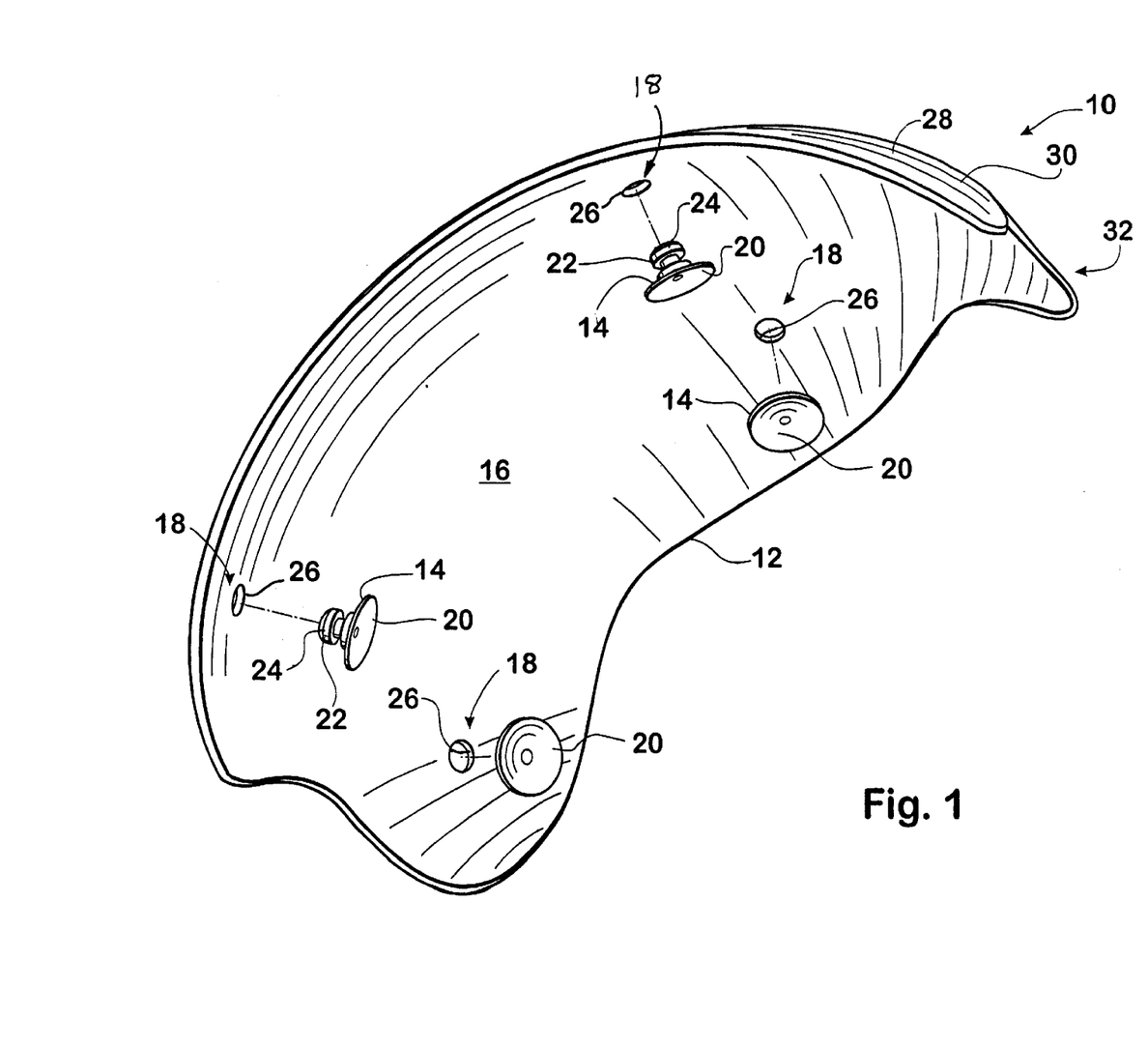
FIG. 1 shows one of a pair of cover members of a first embodiment of a protective device, in accordance with the invention, for a motorcycle.

In FIG. 1, reference 10 generally indicates a three dimensional view of one of a pair of cover members of a first embodiment of a protective device, in accordance with the invention, for a motorcycle.

The cover member 10 includes a shield element or shield 12. The shield 12 is of a polycarbonate material. The shield 12 can also be of a polyvinylchloride material. Further, the shield 12 is transparent. It will be appreciated that the shield 12 can be of any impact resistant, transparent material.

The cover member 10 includes an attachment means in the form of a number of suction connectors 14. The suction connectors 14 are mounted on an inner surface 16 of the shield 12.

The shield 12 has number of openings 18 defined therein. Each suction connector 14 includes a suction cup 20 and an attachment formation in the form of a plug member or plug 22 extending therefrom. Each plug 22 has a recessed engaging formation 24 arranged thereon to engage an inner periphery 26 defining each opening 18. The suction connectors 14 are of a resiliently flexible material so that the plugs 22 can be urged into their respective openings 18 to cause initial deformation of the engaging formations 24. The engaging formations 24 then assume their original shape and engage the inner peripheries 26.

The suction cups 20 are shaped so that as each suction cup 20 is urged onto a substantially smooth and uniform surface, the suction cups 20 are retained in position in a conventional manner.

Figure 3:
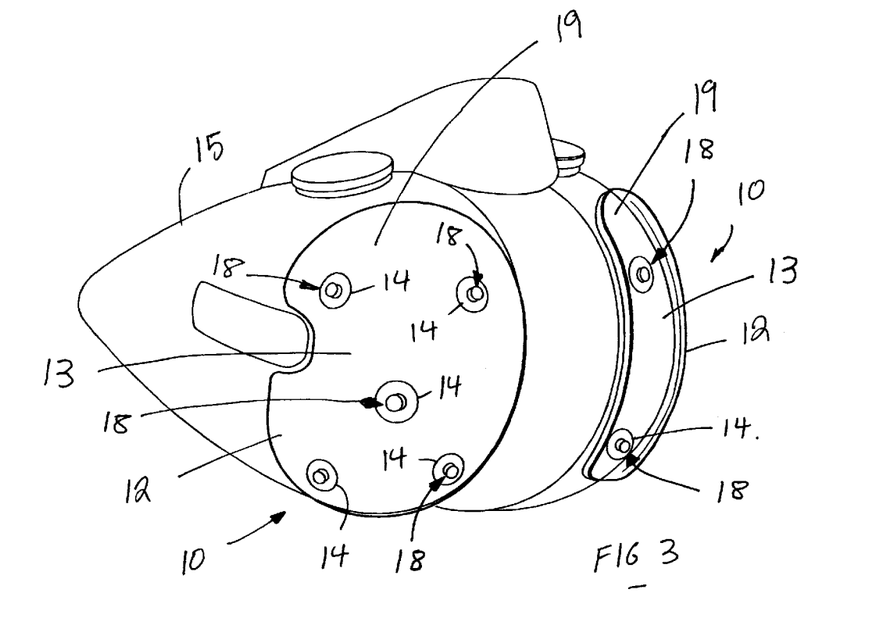
FIG. 3 shows the cover members of FIG. 1 mounted on a fuel tank of a motorcycle.
Figure 4:
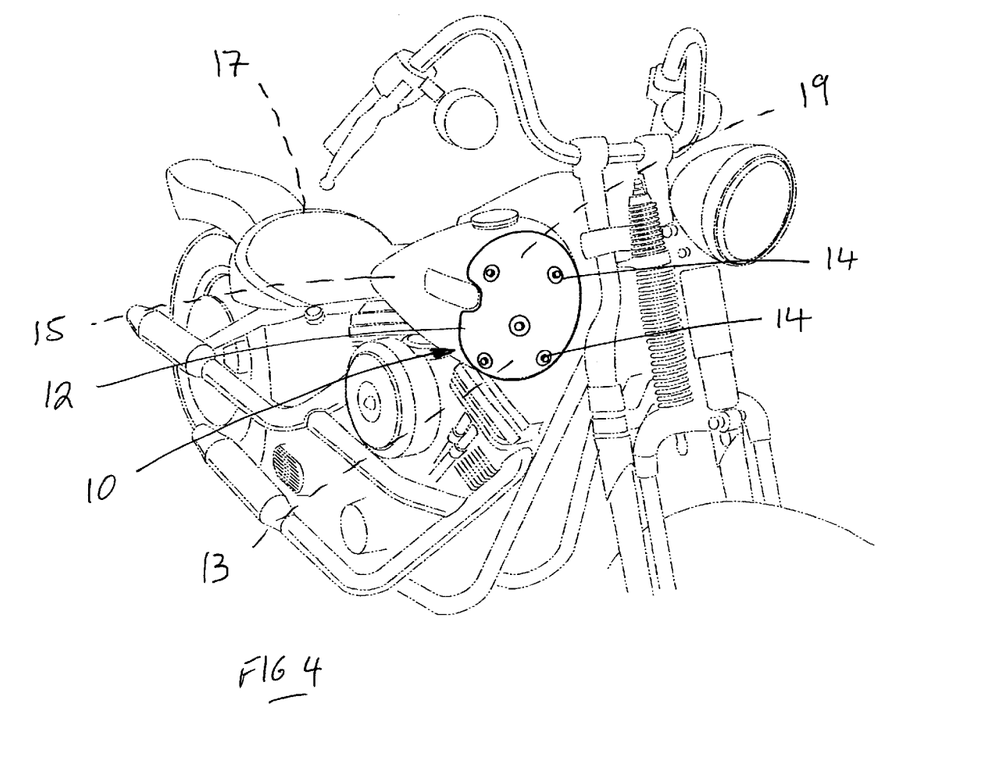
FIG. 4 shows the cover members of FIG. 1 mounted on a motorcycle.

Each shield 12 is shaped to conform to the shape of a fuel tank 15 of a motorcycle 17. In particular, each shield 12 is shaped so that, when the shields 12 are urged into position, the shields 12 cover a side frontal region 13 of the fuel tank 15. It will be appreciated that this side frontal region 13 is especially exposed to flying debris.

Figure 5:
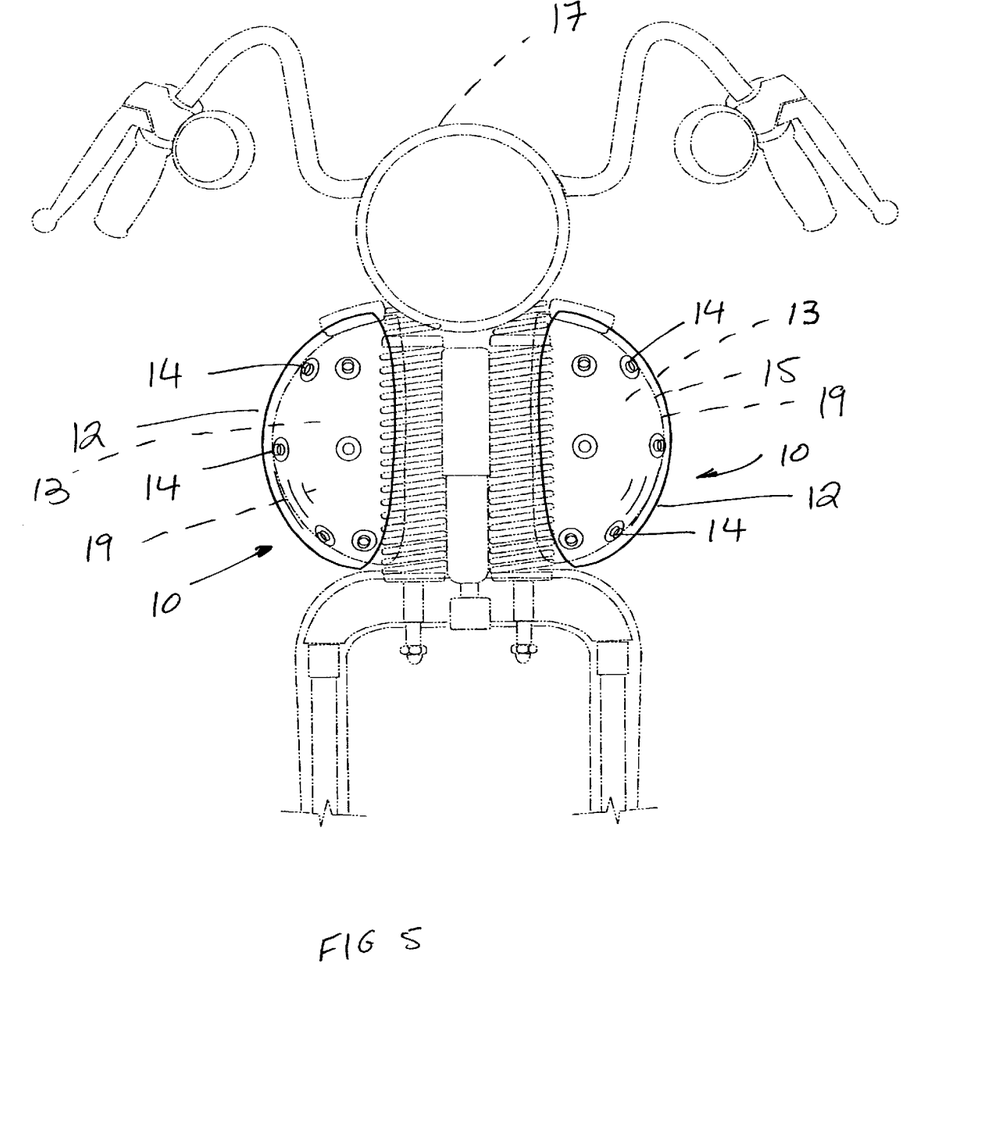
FIG. 5 shows a front view of the motorcycle of FIG. 4.

The plugs 22 are dimensioned so that, when the shields 12 are in position, the shields 12 are retained in a position in which the inner surfaces 16 are spaced from a surface 19 of the fuel tank 15. This positioning can be clearly seen in FIGS. 3 and 5 of the drawings. Thus, the shields 12 can deform to a certain extent without making contact with the fuel tank 15.

The resilience and thickness of each shield 12 is such that the impact of debris such as small stones, on an outer surface 28 of the shield 12 is absorbed substantially without being transferred to the surface of the fuel tank 15.

It will readily be appreciated that, instead of being transparent, the shields 12 can be tinted with a layer having a colour which is aesthetically pleasing.

A frontal portion 30 of each shield 12 has a curved profile indicated at 32 which conforms to the side frontal region 13 of the fuel tank 15. This permits the side frontal region 13 to be protected by the shields 12.

It will be appreciated that the suction connectors 14 allow the shields 12 to be repeatedly removed and re-attached to the fuel tank 15. Furthermore, it will be appreciated that the suction connectors 14 can easily be replaced if necessary.

Figure 2:
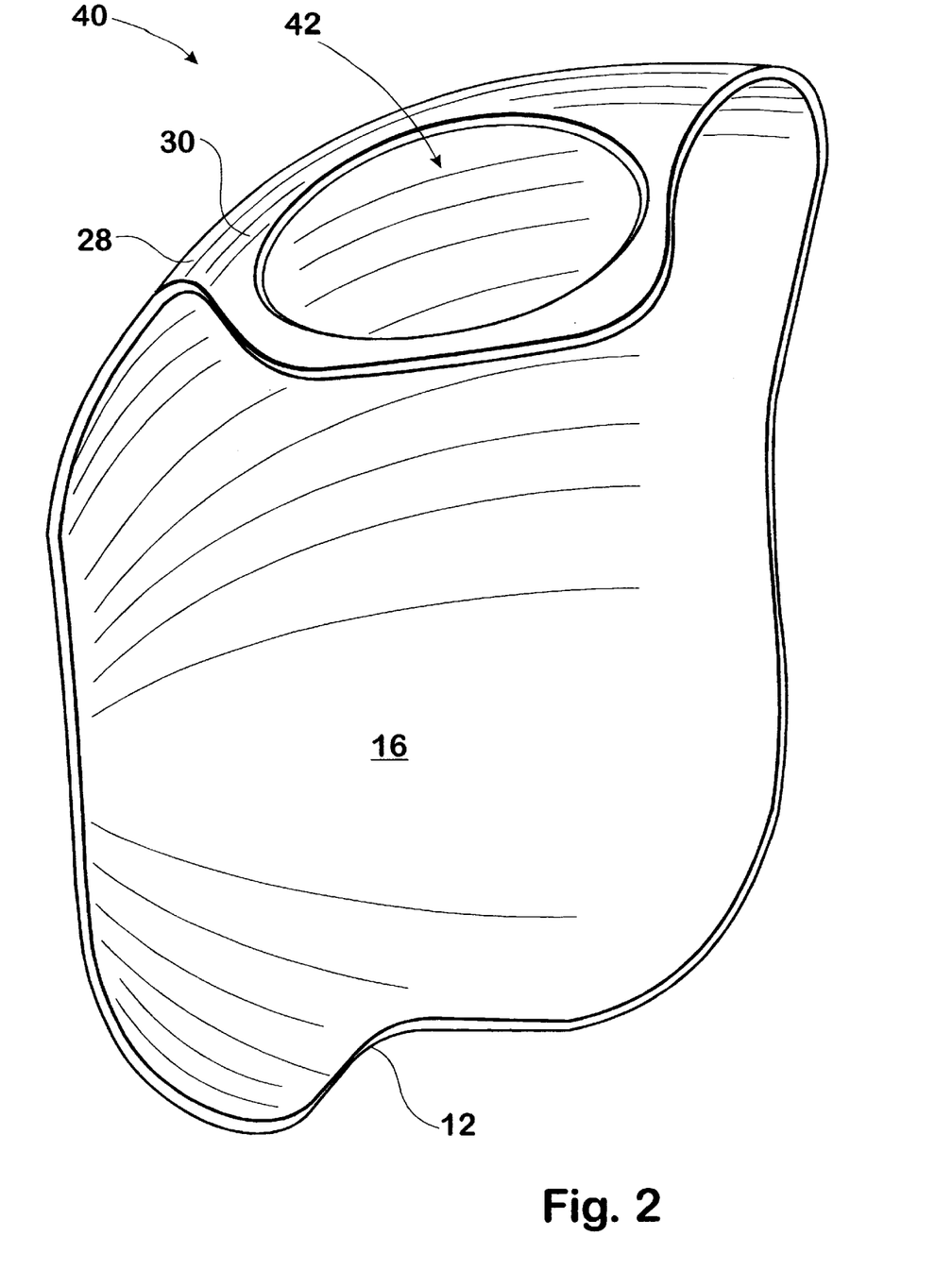
FIG. 2 shows one of a pair of cover members of a second embodiment of a protective device, also in accordance with the invention, for a motorcycle.

In FIG. 2, reference 40 generally indicates a cover member or cover of a pair of covers of a second embodiment of a protective device, also in accordance with the invention, for a motorcycle. With reference to FIG. 1, like reference numerals refer to like parts, unless otherwise specified.

The cover 40 includes an opening 42 defined in the frontal portion 30 of the shield 12. The opening 42 is dimensioned to be complementary to a formation defining the inlet opening of the motorcycle fuel tank.

The shield 12 of the cover 40 is of a flexible, non-resilient material, such as polyethylene. In particular, the material of the shield 12 is such that the shield 12 is inherently capable of being attached to the side frontal region 13 of the fuel tank 15. Such attachment is generally referred to as "clinging". It follows that the material of the shield 12 has a clinging characteristic. In particular, the material of the shield 12 can be a polyolefin or a polyamide.

It will be appreciated that a layer of adhesive may also be applied to the inner surface 16 of the shield 12. This permits the shield 12 to be adhered to the side frontal region 13. The adhesive selected is preferably of the type that will allow the shields 12 to be repeatedly removed and re-applied.

It follows that the shields 12 of the cover 40 do not include the openings 18 and the suction cups 14.

Figure 6:
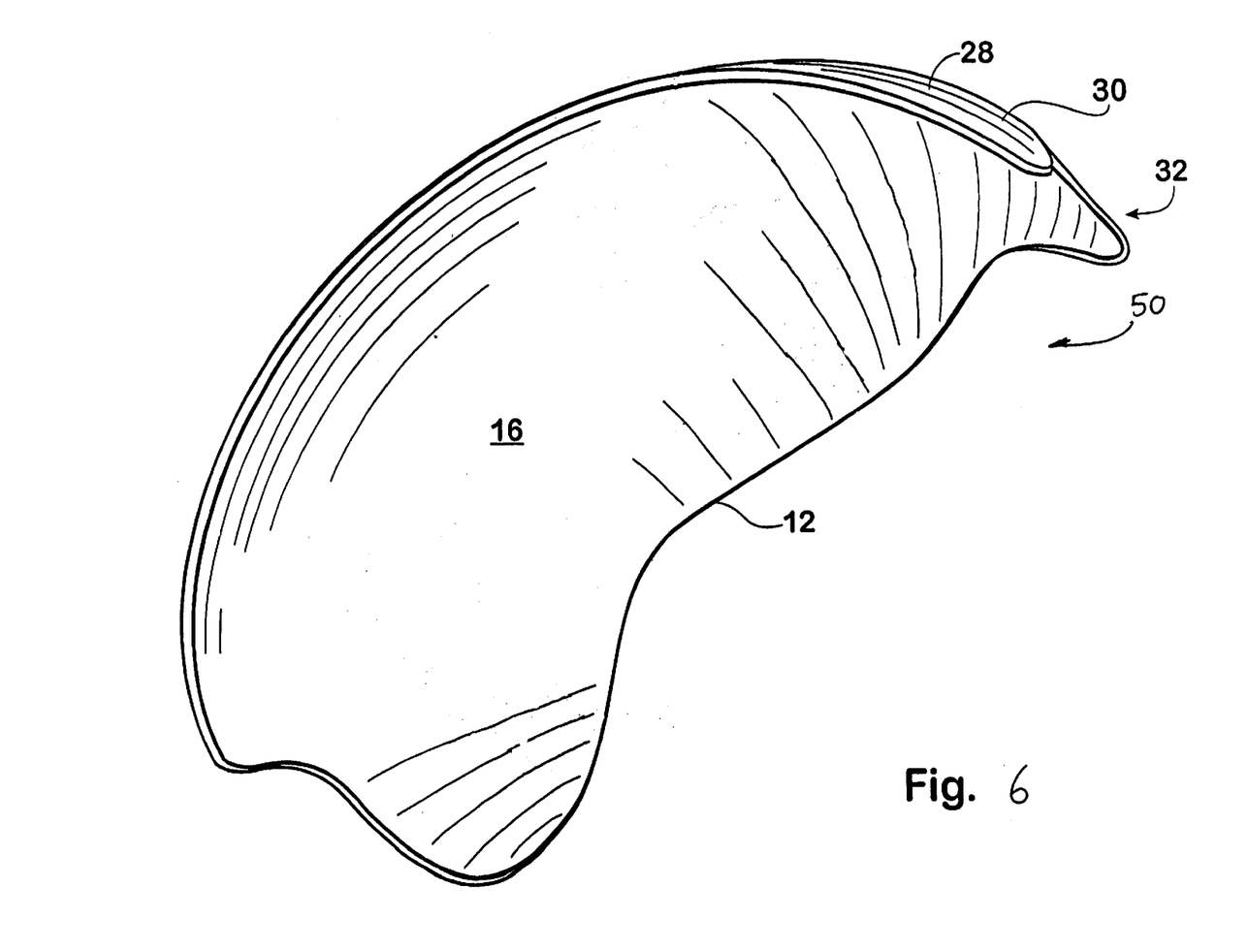
FIG. 6 shows one of a pair of cover members of a third embodiment of a protective device, in accordance with the invention, for a motorcycle.

In FIG. 6, reference numeral 50 generally indicates a cover member or cover of a pair of covers of a third embodiment of a protective device, in accordance with the invention, for a motorcycle. With reference to FIGS. 1 to 5, like reference numerals refer to like parts, unless otherwise specified.

The cover 50 is generally of the same shape as the cover 10. However, the cover 50 does not include the suction connectors 14 and the corresponding openings 18.

Instead, as with the cover 40, the cover 50 is of a flexible, non-resilient material, such as polyethylene. As with the cover 40, the material of the shield 12 can be a polyolefin or a polyamide with the necessary clinging characteristics. Furthermore, the thickness of the cover 50 is such that the side frontal regions 13 are adequately protected against flying debris.

Figure 7:
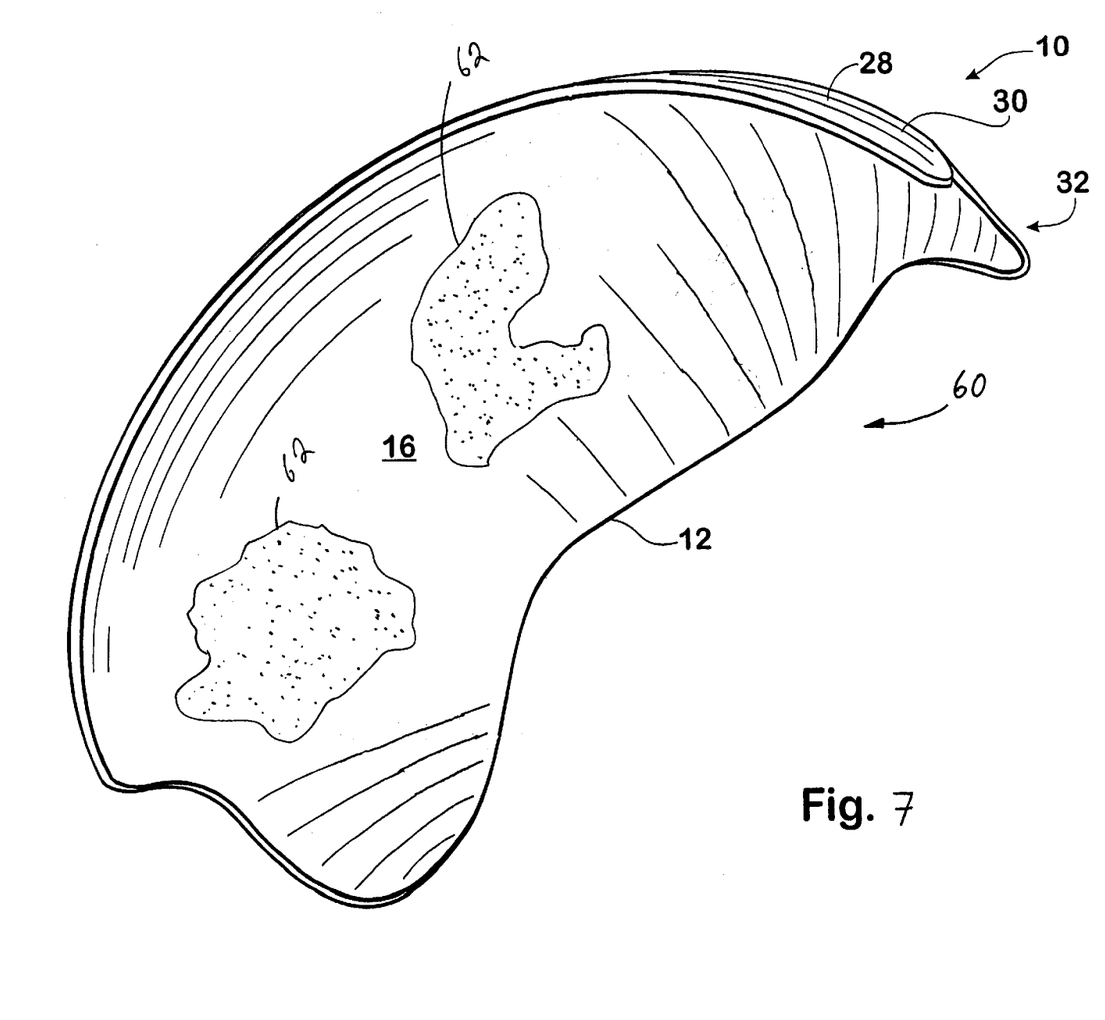
FIG. 7 shows one of a pair of cover members of a fourth embodiment of a protective device, in accordance with the invention, for a motorcycle.

In FIG. 7, reference numeral 60 generally indicates a cover member or cover of a pair of covers of a fourth embodiment of a protective device, in accordance with the invention, for a motorcycle. With reference to FIGS. 1 to 6, like reference numerals refer to like parts, unless otherwise specified.

The shield 12 of the cover 60 is of any, suitable impact resistant material. It follows that the shield 12 of the cover 60 can be of the same material as the shield 12 of any of the covers 10, 40, 50.

The cover 60 includes an adhesive, schematically shown at 62, to attach the shield 12 to a respective side frontal region 13.

The applicant believes that this invention provides a means whereby a fuel tank of a motorcycle can be protected from flying debris such as small stones. This form of debris can cause a substantial amount of damage to the tank of a motorcycle, resulting in costly repairs.

It will be appreciated that a particular advantage of this invention is that protection is achieved while still retaining an aesthetically pleasing appearance. This is done by having the cover member transparent so that the original finish of the fuel tank is visible. Instead, as described above, the cover member can be coated with a suitable layer of a colouring medium to provide the desired aesthetic appearance.

It will of course be realised that the above has been given only by way of illustrative example of the invention. All modifications and variations to the embodiments described above are to be regarded as falling within the broad scope and ambit of the invention described in this specification, with reference to the drawings, and in the claims.

What is claimed is:

1. A motorcycle fuel tank protector comprising a pair of resilient cover members each of which is shaped to substantially conform to and bound a respective side frontal portion of the fuel tank that is prone to stone chip damage, each cover member being removably attachable to and spaced from said corresponding side frontal portion in use solely by a plurality of resilient suction connectors distributed over the inner surface of said cover member, each said suction connector including a suction cup portion releasably engageable with said side frontal portion.

2. A motorcycle fuel tank protector as claimed in claim 1, in which each cover member is of a transparent material so that said fuel tank is visible beneath the motorcycle fuel tank protector.

3. A motorcycle fuel tank protector as claimed in claim 1, in which each cover member is of a flexible material.

4. A motorcycle fuel tank protector as claimed in claim 1, in which each cover member is of a plastics material.

5. A motorcycle fuel tank protector as claimed in claim 1, in which each suction connector includes an attachment formation that extends from the suction cup, each cover member having a number of complementary attachment formations, each attachment formation of the suction connectors being releasably engageable with a respective complementary attachment formation.

6. A motorcycle fuel tank protector as claimed in claim 5, in which each complementary attachment formation is in the form of an opening defined in the cover member, each attachment formation being received in each respective opening to engage the cover member.

\* \* \* \* \*

UNITED STATES PATENT AND TRADEMARK OFFICE
CERTIFICATE OF CORRECTION

PATENT NO. : 6,896,278 B1
DATED : May 24, 2005
INVENTOR(S) : Hepburn

It is certified that error appears in the above-identified patent and that said Letters Patent is hereby corrected as shown below:

<u>Title page,</u>
Item [76], Inventor, change "Ciagiraba" to -- Clagiraba --.

Signed and Sealed this

Sixth Day of September, 2005

JON W. DUDAS
*Director of the United States Patent and Trademark Office*